United States Patent
Yoshida et al.

(10) Patent No.: US 6,463,519 B1
(45) Date of Patent: Oct. 8, 2002

(54) MULTI-CPU UNIT

(75) Inventors: Masatoshi Yoshida; Tatsumi Yabusaki, both of Aichi (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/736,452

(22) Filed: Dec. 15, 2000

Related U.S. Application Data

(63) Continuation of application No. PCT/JP98/02939, filed on Jun. 30, 1998.

(51) Int. Cl.[7] ............................................. G06F 13/00
(52) U.S. Cl. ............................................................ 712/28
(58) Field of Search ............................. 712/28; 709/243

(56) References Cited

U.S. PATENT DOCUMENTS

| | | | |
|---|---|---|---|
| 5,155,855 A | * | 10/1992 | Masuo et al. ............... 711/152 |
| 5,347,639 A | * | 9/1994 | Rechtschaffen ............. 712/203 |
| 5,867,723 A | * | 2/1999 | Chin ........................... 712/11 |
| 6,178,515 B1 | * | 1/2001 | Hayashi et al. ................ 713/1 |

FOREIGN PATENT DOCUMENTS

| | | |
|---|---|---|
| JP | 7-319515 | 12/1995 |

* cited by examiner

*Primary Examiner*—Eric Coleman
(74) *Attorney, Agent, or Firm*—Sughrue Mion, PLLC

(57) ABSTRACT

A plurality of CPU units are used for multiple CPU control. Each CPU unit includes a device memory for processing device data, a shared memory for reading data from and writing data into the CPU unit and other CPU units, and OS describing the procedure for transferring data, and a microprocessor for transferring data between its own CPU unit and other CPU units according to the procedure described in the OS. Each microprocessor fetches the device data stored in the shared memory of other CPU units into the device memory of its own CPU unit.

2 Claims, 14 Drawing Sheets

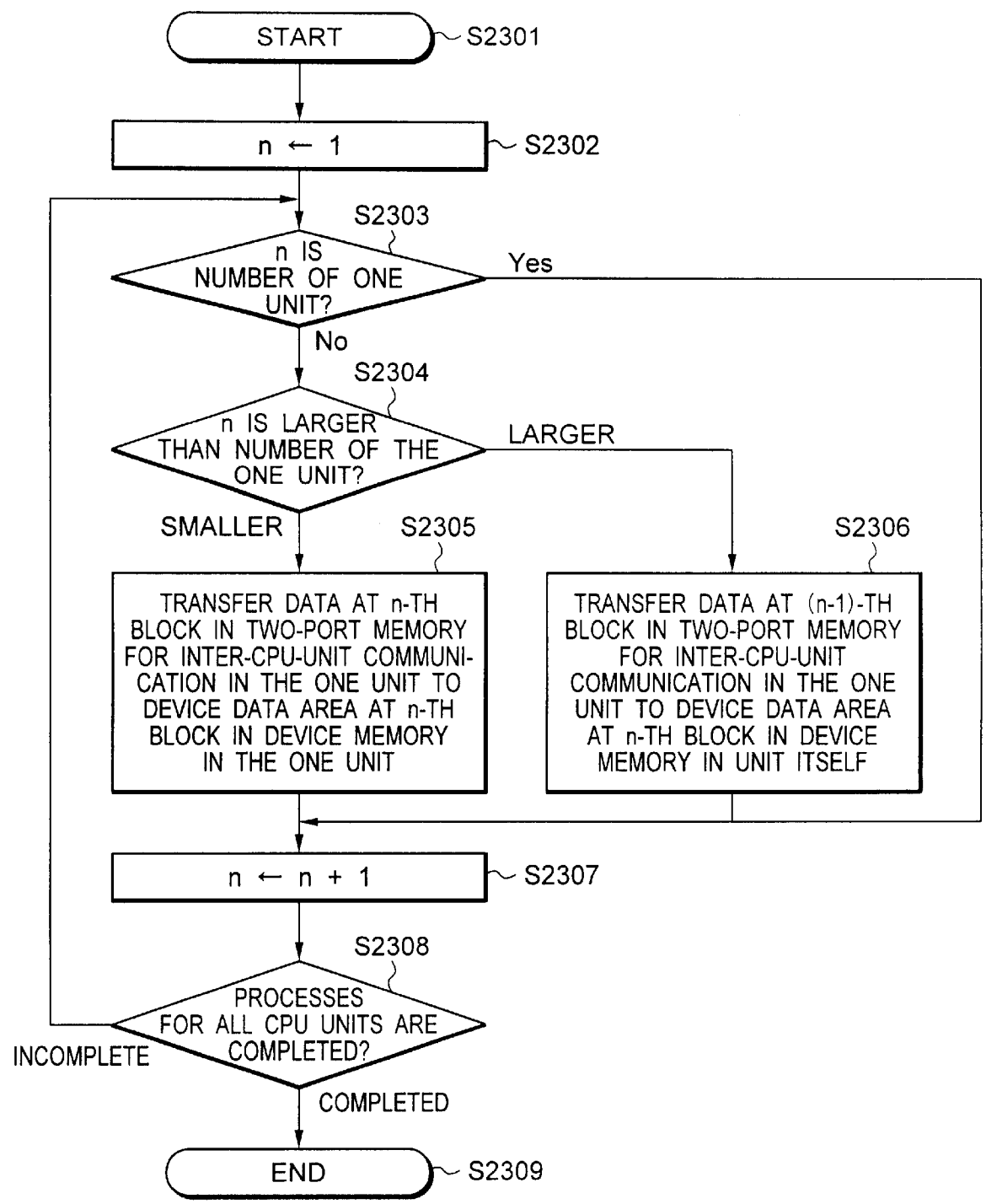

MULTI-CPU UNIT

CROSS REFERENCE TO RELATED APPLICATION

This is a continuation of International Application PCT/JP98/02939, with an international filing date of Jun. 30, 1998, the contents of which is hereby incorporated by reference into the present application. The International Application PCT/JP98/02939 was published in a language other than English.

TECHINAL FIELD

The present invention relates to a multi-CPU unit which is a programmable controller CPU unit used for industrial equipment and has a plurality of CPU units used for a multi-CPU control operation, and more particularly, to a multi-CPU unit in which the memory capacity can be reduced and the processing speed can be improved.

BACKGROUND ART

FIG. 11 is a structural diagram of a conventional multi-CPU unit, and FIG. 12 is a diagram showing the detail of device memories and two-port memories for inter-CPU-unit communication in FIG. 11. Referring to FIG. 11, a CPU unit 1A comprises a microprocessor 2A for transferring data in accordance with information which is obtained by decoding an OS program, an OS 26A for transferring data between a device memory and a two-port memory for communication, a device memory 3A for handling device data, e.g., D0 and D1 in a program which is processed by the CPU unit A, and a two-port memory 24A for inter-CPU-unit communication which communicates data between the CPU units under multi-CPU control operation.

A CPU unit 1B, which has the same configuration as that of the CPU unit 1A, comprises a microprocessor 2B for transferring data in accordance with information which is obtained by decoding an OS program, an OS 26B for transferring data between a device memory and a two-port memory for communication, a device memory 3B for handling device data, e.g., D0 and D1 in a program which is processed by the CPU unit B, and a two-port memory 24B for inter-CPU-unit communication for communicating data between the CPU units under the multi-CPU control operation.

Further, a CPU unit 1C, which has the same configuration as that of the CPU unit 1A, comprises a microprocessor 2C for transferring data in accordance with information which is obtained by decoding an OS program, an OS 26C for transferring data between a device memory and a two-port memory for communication, a device memory 3C for handling device data, e.g., D0 and D1 in a program which is processed by the CPU unit C, and a two-port memory 24C for inter-CPU-unit communication for communicating data between the CPU units under the multi-CPU control operation.

Referring to FIG. 12, the device memory 3A comprises a device data area 10A for CPU unit 1A, a device data area 11A for CPU unit 1B, and a device data area 12A for CPU unit 1C. The two-port memory 24A for inter-CPU-unit communication comprises a data storing area 30A for CPU unit 1B and a data storing area 31A for CPU unit 1C.

The device memory 3B comprises a device data area 10B for CPU unit 1A, a device data area 11B for CPU unit 1B, and a device data area 12B for CPU unit 1C. The two-port memory 24A for inter-CPU-unit communication comprises a data storing area 30B for CPU unit 1A and a data storing area 31B for CPU unit 1C.

Further, the device memory 3C comprises a device data area 10C for CPU unit 1A, a device data area 11C for CPU unit 1B, and a device data area 12C for CPU unit 1C. The two-port memory 24C for inter-CPU-unit communication comprises a data storing area 30C for CPU unit 1A and a data storing area 31C for CPU unit 1B.

FIG. 13 and FIG. 14 are flowcharts showing software which is built in the OSs 26A, 26B,,and 26C in the CPUs and concerns data transfer between the device memories and the two ports for communication. Referring to FIG. 13, first, one is substituted for n so as to determine a CPU-unit number (step S2202), it is checked to see if n coincides with the CPU-unit number of one CPU-7unit (step S2203), the CPU unit is connected to the two-port memory for inter-CPU-unit communication of the CPU unit which is indicated by n if it is determined that n is different from the one CPU unit (step S2204), and further, the block position of the two-port memory for inter-CPU-unit communication to which device data is written is calculated on the basis of the number (steps S2205, S2206, and S2207). After writing the data to the two-port memory for inter-CPU-unit communication, the two-port memory for inter-CPU-unit communication in the CPU unit is separated (step S2208), the next number is obtained (step S2209), and it is checked to see if there are any more CPU units which are used for the multi-CPU control operation (step S2210). If NO, the processing routine is completed (step S2211) and, if YES, the series of the operations is repeated again (steps. S2203 to S2210).

Here, a conventional technique-will be described in accordance with the sequence.

As shown in FIG. 11, the multi-CPU unit comprises the three units of the CPU units 1A, 1B, and 1C. The CPU units 1A, 1B, and 1C comprise the device memories 3A, 3B, and 3C having the device data areas for CPU units 1A, 1B, and 1C, and the two-port memories 24A, 24B, and 24C for inter-CPU-unit communication for communication with the two CPU units other than the one CPU unit of the CPU units 1A, 1B, and 1C, respectively, as shown in FIG. 11.

The CPU units 1A, 1B, and 1C have CPU-unit numbers thereof which are determined by numbers written to the OSs 26A, 26B, and 26C which the CPU units 1A, 1B, and 1C have, respectively. The CPU-unit number gives which number the one CPU unit has under the multi-CPU control operation. Herein, the CPU-unit number of the CPU unit 1A is labeled as 1, the CPU-unit number of the CPU unit 1B as 2, and the CPU-unit number of the CPU unit 1C as 3..

To start with, in order to communicate the contents of the device data area 10A for CPU unit 1A to the CPU unit 1B, the OS 26A connects the CPU unit 1A to the two-port memory 24B for inter-CPU-unit communication in the CPU unit 1B via a communication line 7B. From the CPU-unit number, it is calculated to where the contents of the device data area 10A for CPU unit 1A are to be written in the two-port memory 24B for inter-CPU-unit communication in the CPU unit 1B. According to the calculating method, the CPU-unit number of the one CPU unit is compared with the CPU-unit number of the CPU unit which has the contents to be written, the contents are written to the portion of the CPU-unit number of the one CPU-unit (the portion becomes the first, if the CPU-unit number is 1) if the CPU-unit number of the one CPU unit is smaller, and the contents are written to the portion which is obtained by subtracting one from the CPU-unit number of the one CPU unit (the portion becomes the (2-1)th portion, that is, the first, if the CPU-unit number is 2) if the CPU-unit number of the one CPU unit is larger. Since the CPU-unit number of the CPU unit 1A is 1 and the CPU-unit number of the CPU unit 1B is 2, the CPU-unit number of the CPU unit 1A is smaller. Consequently, the OS 26A in the CPU unit 1A writes the data to the data storing area 30B for CPU unit 1A which exists at the first area in the two-port memory 24B for inter-CPU-unit communication, via a communication line 5A in the CPU unit 1A and the communication line 71 in the CPU unit 1B.

By using a method similar thereto, the OS 26A in the CPU unit 1A writes the data of the device data area 10A for CPU unit 1A in the device memory 3A in the CPU unit 1A to the data storing area 30C for CPU unit 1A in the two-port memory 24C for inter-CPU-unit communication in the CPU unit 1C, via the communication line 5A in the CPU unit 1A and a communication line 7C in the CPU unit 1C.

By using a sequence similar thereto, the OS 26B in the CPU unit 1B writes the data of the device data area 11B for CPU unit 1B in the device memory 3B in the CPU unit 1B to the data storing area 30A for CPU unit 1B in the two-port memory 24A for inter-CPU-unit communication in the CPU unit 1A, via a communication line 5B in the CPU unit 1B and a communication line 7A in the CPU unit 1A. The OS 26B in the CPU unit 1B also writes the data to the data storing area 31C for CPU unit 1B in the two-port-memory 24C for inter-CPU-unit communication in the CPU unit 1C, via the communication line 5B in the CPU unit 1B and the communication line 7C in the CPU unit 1C.

Further, by using a sequence similar thereto, the OS 26C in the CPU unit 1C writes the data of the device data area 11C for CPU unit 1C in the device memory 3C in the CPU unit 1C to the data storing area 31A for CPU unit 1C in the two-port memory 24A for inter-CPU-unit communication in the CPU unit 1A, via a communication line 5C in the CPU unit 1C and the communication line 7A in the CPU unit 1A. The OS 26C in the CPU 1C also writes the data to the data storing area 31B for CPU unit 1C in the two-port memory 24B for inter-CPU-unit communication in the CPU unit 1B, via the communication line 5C in the CPU unit 1C and the communication line 7B in the CPU unit 1B. Thus, the device data of the other CPU-units is written to the two-port memories for inter-CPU-unit communication in the CPU units, respectively.

The foregoing results in transferring to the device memories the device data which is written to the two-port memories for inter-CPU-unit communication in the CPU units. The block 30A as the data storing area for CPU unit 1B in the two-port memory 24A for inter-CPU-unit communication is calculated from the unit number of the CPU unit 1A and the unit number of the CPU unit 1B. The device data area 11A for the CPU unit 1B in the device memory 3A is calculated from the unit number of the CPU unit 1B. The OS 26A in the CPU unit 1A transfers the contents to the device data area 11A for the CPU unit 1B in the device memory 3A in the CPU unit 1A from the data storing area 30A for the CPU unit 1B in the two-port memory 24A for inter-CPU-unit communication in the CPU unit 1A.

Similarly, the device data area 12A for CPU unit 1C in the device memory 3A and the data storing area 31A for CPU unit 1C in the two-port memory 24A for inter-CPU-unit communication are calculated from the unit number of the CPU unit 1C. The OS 26A in the CPU unit 1A transfers the contents of the data storing area 31A for CPU unit 1C to the device data area 12A for CPU unit 1C. This results in the existence of the device data for CPU unit 1A, device data for CPU unit 1B, and device data for CPU unit 1C in the device memory 3A in the CPU unit 1A.

By using the same sequence as that in the case of transferring the data to the device memory 3A from the two-port memory 24A for inter-CPU-unit communication in the CPU unit 1A, the OS 26B in the CPU unit 1B transfers the contents of the data storing area 30B for CPU unit 1A and the data storing area 31B for CPU unit 1C in the two-port memory 24B for inter-CPU-unit communication in the CPU 1B to the device data area 10B for CPU unit 1A and the device data area 12B for CPU unit 1C in the device memory 3B.

By using the same sequence as that in the case of transferring the data to the device memory 3A from the two-port memory 24A for inter-CPU-unit communication in the CPU unit 1A, the OS 26C in the CPU unit 1C transfers the contents of the data storing area 30C for CPU unit 1A and the data storing area 31C for CPU unit 1B in the two-port memory 24C for inter-CPU-unit communication in the CPU 1C to the device data area 10C for CPU unit 1A and the device data area 11C for CPU unit 1B in the device memory 3C.

FIG. 14 shows the transfer operation from the two-port memory for inter-CPU-unit communication to the device memory. First of all, an initial value 1 of the CPU-unit number is substituted for n (step S2302), and it is determined whether or not n is the number of one CPU-unit (step S2303). If NO, n is the number of the other CPU-unit and, therefore, it is determined whether or not this number is smaller/larger than the CPU-unit number of the one CPU-unit (step S2304).

If this number is smaller than the one CPU-unit number, the data is transferred to an n-th block in the device memory from an n-th block in the two-port memory for inter-CPU-unit communication (step S2305). If this number is larger than the number of the one CPU-unit, the data is transferred to the n-th block in the device memory from an (n-l)-th block in the two-port memory for inter-CPU-unit communication (step S2306).

One is added to the CPU-unit number n, thereby calculating the next CPU-unit number (step S2307). It is determined whether or not the number exists in the CPU units under the multi-CPU control operation (step S2308). If the number does not exist, the sequence is completed (step S2309). If the number exists, the series of operations is sequentially executed (step S2303 to step S2308).

According to the above-explained method for communicating the device data under the multi-CPU control operation, it is necessary to have the data storing area for the other CPU-unit except for the one CPU-unit which multi-CPU-controls the CPUs 1A, 1B, and 1C in the two-port memories 24, 24B, and 24C for inter-CPU communication and to write the device data of the one CPU-unit, which corresponds to the number of the other CPU-units, to the data storing areas in the two-port memories for inter-CPU communication. It is also necessary to connect and disconnect the two-port memories for inter-CPU communication which corresponds to the number of CPU-units except for the one CPU-unit which constructs the multi-CPU control. Therefore, if increasing the number of CPU units constructing the multi-CPU, the numbers of connecting times and disconnecting times of the two-port memories for inter-CPU communication increase correspondingly thereto and the processing time increases. Thus, the ratio of time for the control processing, which is inherent, decreases and the response for the control operation deteriorates.

If the number of CPU units constructing the multi-CPU control operation increases, the data storing area in the two-port memory for inter-CPU communication of each CPU unit necessary increases corresponding to the number of CPU units other than the one CPU-unit which constructs the multi-CPU control and a two-port memory for inter-CPU communication having a large capacity is necessitated, thereby raising the costs.

According to the present invention, it is possible to reduce the process for communicating the device data and to save memory in the CPU unit under the multi-CPU control operation by changing the configuration of the data storing area in the two-port memory for inter-CPU communication, which the conventional CPU-unit has.

DISCLOSURE OF INVENTION

According to the present invention, there is provided one multi-CPU unit comprising a plurality of CPU units used for multi-CPU control operation, in which each of the CPU units comprises a device memory for handling device data, a shared memory in which data can be read/written from/to each of the CPU-units itself and the other CPU-unit, an OS on which sequence of data transfer is written, and a microprocessor for transferring data between each of the CPU units itself and the other CPU-unit on the basis of the sequence which is written on the OS, wherein each microprocessor reads the device data which is stored in the shared memory of the other CPU-unit to the device memory in each of the CPU-units itself.

The device memory has a device data area for each of the CPU-units itself and a device data area for the other CPU-unit which corresponds to the number of the other CPU-units, and each microprocessor reads the device data which is stored in the shared memory of the other CPU-unit to the device data area for the other CPU-unit in the device memory of each of the CPU-units itself.

According to the present invention, there is provided another multi-CPU unit comprising a plurality of CPU units used for multi-CPU control operation, in which each CPU unit comprises a device memory for handling device data, a shared memory in which data can be read/written from/to each of the CPU-units itself and the other CPU-unit, an OS on which sequence of data transfer is written, and a microprocessor for transferring data between each of the CPU-units itself and the other CPU-unit on the basis of the sequence which is written on the OS, wherein the shared memory has a device data area for each of the CPU-units itself and a device data area for the other CPU-units which corresponds to the number of the other CPU-units and each microprocessor reads the device data of all of the CPU units exclusive of each of the CPU-unit itself, which is stored in the shared memory of the adjacent CPU unit, to the device data area for the other CPU-unit in the shared-memory of each of the CPU units itself.

According to the present invention, there is provided yet another multi-CPU unit comprising a plurality of CPU units used for multi-CPU control operation, in which each of the CPU units comprises a device memory for handling device data, a shared memory in which data can be read/written from/to each of the CPU-units itself and the other CPU-unit, an OS on which sequence of data transfer is written, and a microprocessor for transferring data-between each of the CPU-units itself and the other CPU-unit on the basis of the sequence which is written on the OS, wherein the OS designates a unit number of the other CPU-unit and has a unit-number designating transfer instruction for directly transferring data to the shared memory of the other CPU-unit, and the microprocessor data-transfers the device data of the device memory of each of the CPU units itself to the shared memory of the other CPU-unit by using the unit-number designating transfer instruction.

The shared memory has the device data area for each of the CPU-units itself and the device data area for the other CPU-unit which corresponds to the number of the other CPU-units, and the microprocessor data-transfers the device data of each of the CPU units itself to the shared memory in the other CPU-unit by using the unit-number designating transfer instruction.

BRIEF DESCRIPTION OF THE DRAWINGS

FIG. 14 is a flowchart showing software concerning the data transfer between the device memory and the two ports for communication.

BEST MODE FOR CARRYING OUT THE INVENTION

Embodiments according to the present invention will be described hereinbelow with reference to the drawings.

First embodiment

Figure 1:
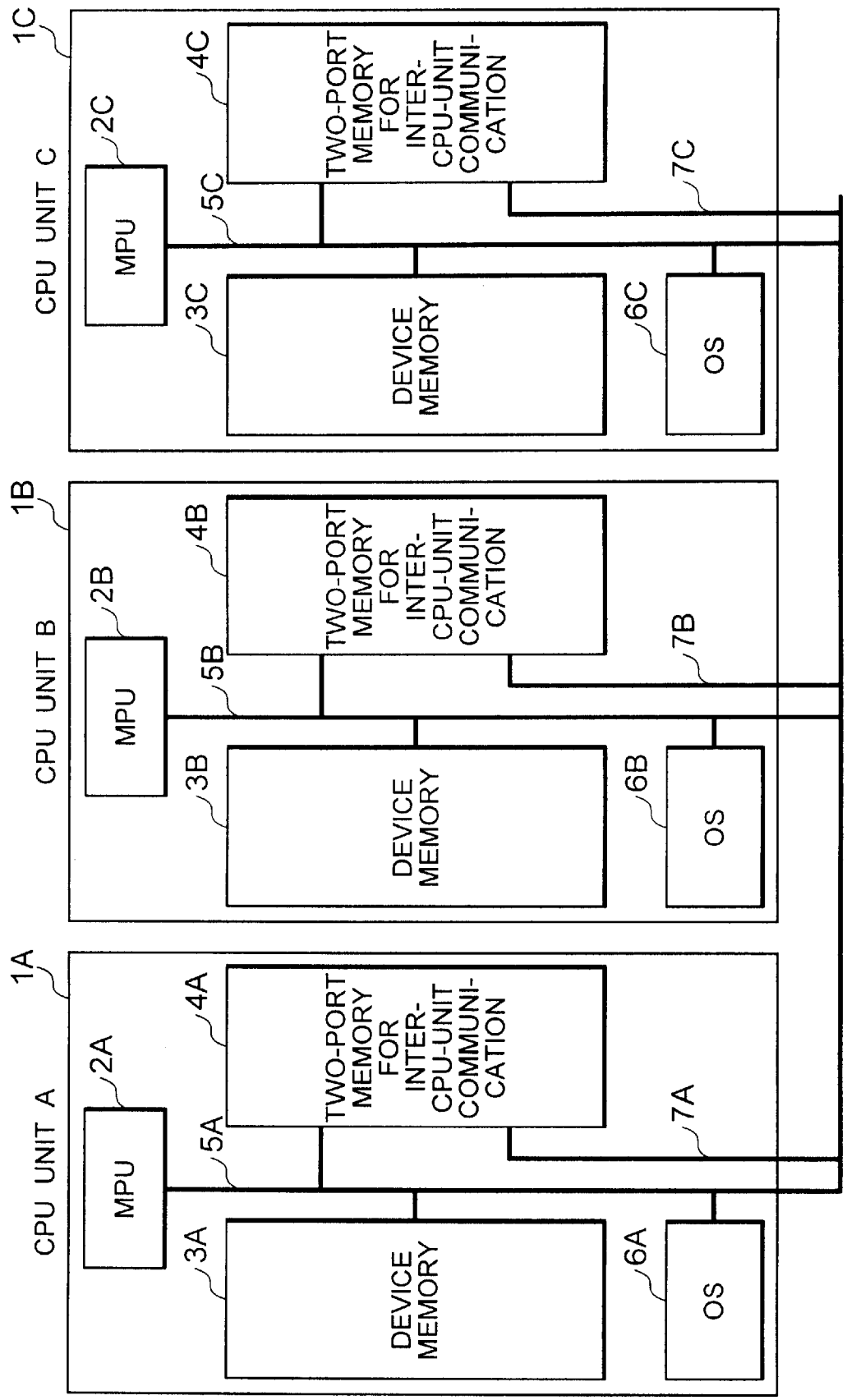
FIG. 1 is a structural diagram of one multi-CPU unit according to the present invention.
Figure 2:
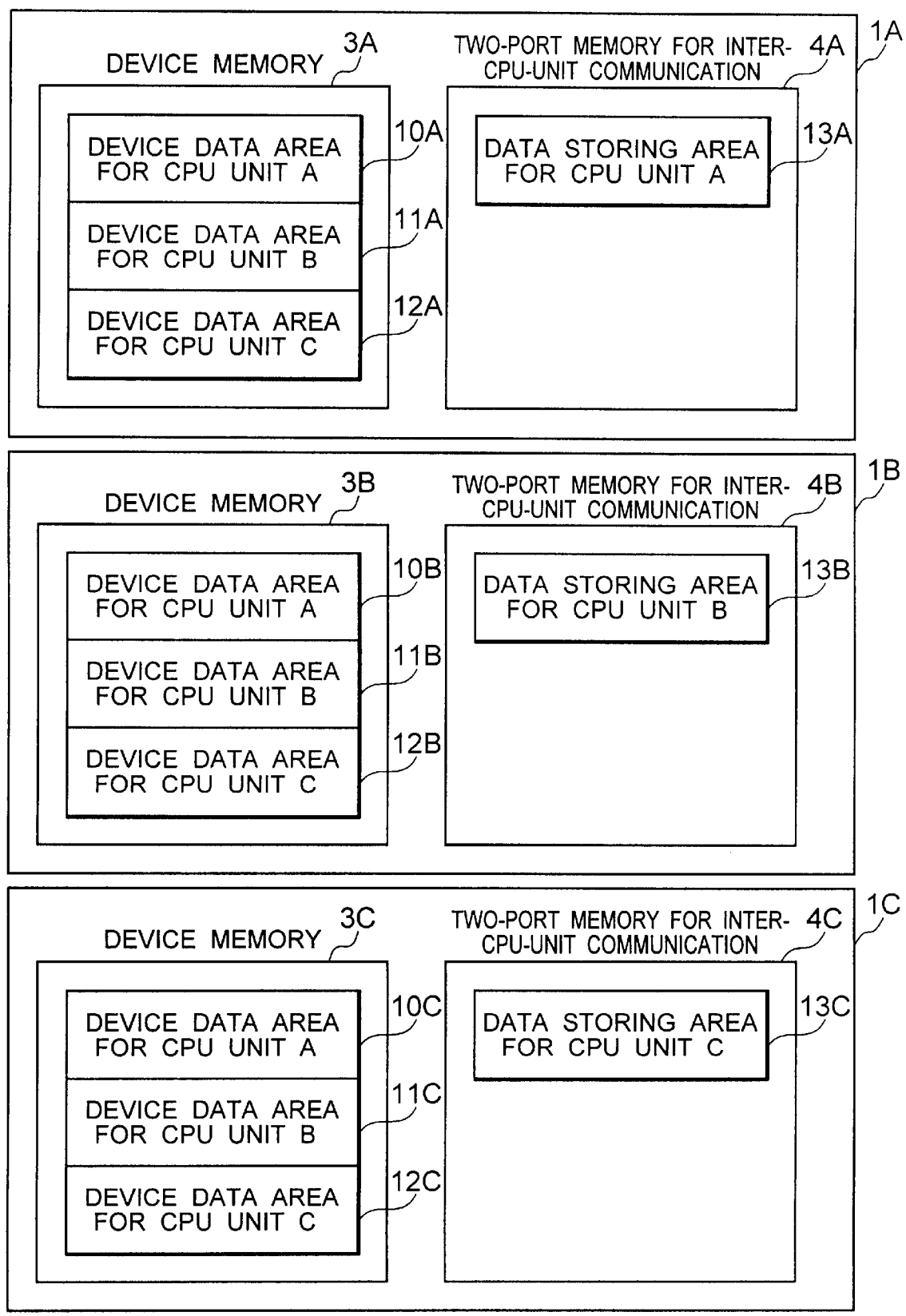
FIG. 2 is a diagram showing the detail of device memories and two-port memories for inter-CPU-unit communication.

FIG. 1 is a structural diagram of a multi-CPU unit according to the present invention, and FIG. 2 is a diagram showing the detail of device memories in FIG. 1 and two-port memories for inter-CPU-unit communication therein. Referring to FIG. 1, a CPU unit 1A comprises a microprocessor 2A which transfers data in accordance with information that is obtained by decoding an OS program, an OS 6A which transfers data between a device memory and a two-port memory for communication, a device memory 3A which handles device data, e.g., D0 and D1, on a program that is processed by the CPU unit A, and a two-port memory 4A for inter-CPU-unit communication which communicates data between the CPU units under multi-CPU control operation.

Similarly, a CPU unit 1B comprises a microprocessor 2B which transfers data in accordance with information that is obtained by decoding an OS program, an OS 6B which transfers data between a device memory and a two-port memory for communication, a device memory 3B which handles device data, e.g., D0 and D1, on a program that is processed by the CPU unit B, and a two-port memory 4B for inter-CPU-unit communication which communicates data between the CPU units under the multi-CPU control operation.

Likewise, a CPU unit 1C comprises a microprocessor 2C which transfers data in accordance with information that is obtained by decoding an Os program, an OS 6C which transfers data between a device memory and a two-port memory for communication, a device memory 3C which handles device data, e.g., D0 and D1, on a program that is processed by the CPU unit C, and a two-port memory 4C for inter-CPU-unit communication which communicates data between the CPU units under the multi-CPU control operation.

Referring to FIG. 2, the device memory 3A comprises a device data area 10A for CPU unit 1A, a device data area 11A for CPU unit 1B, and a device area 12A for CPU unit 1C. The two-port memory 4A for inter-CPU-unit communication comprises a data storing area 13A for CPU unit 1A.

The device memory 3B also comprises a device data area 10B for CPU unit 1A, a device data area 11B for CPU unit 1B, and a device area 12B for CPU unit 1C. The two-port memory 4B for inter-CPU-unit communication comprises a data storing area 13B for CPU unit 1B.

Further, the device memory 3C comprises a device data area 10C for CPU unit 1A, a device data area 11C for CPU unit 1B, and a device area 12C for CPU unit 1C. The two-port memory 4C for inter-CPU-unit communication comprises a data storing area 13C for CPU unit 1A.

Figure 3:
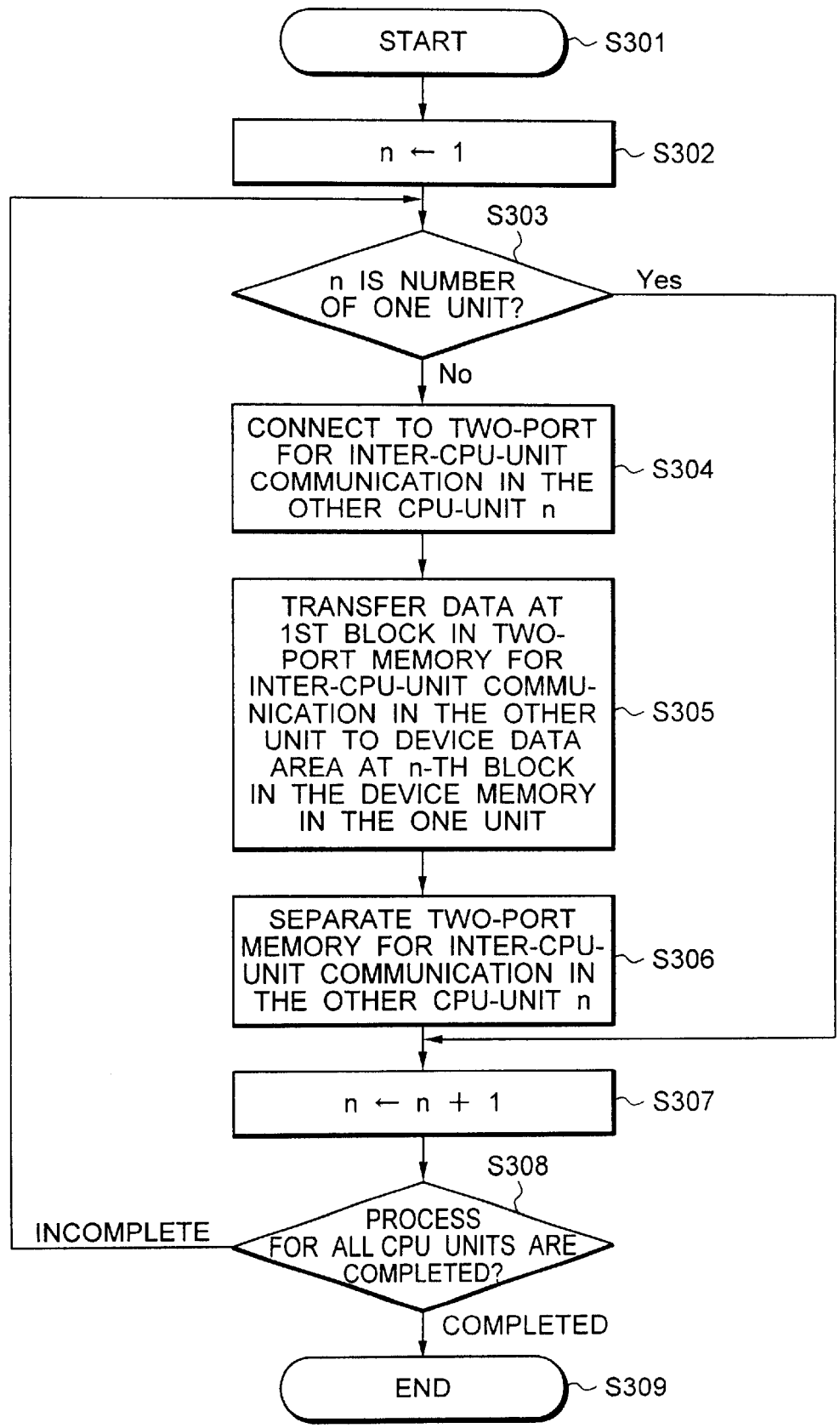
FIG. 3 is a flowchart showing software concerning data transfer.
Figure 4:
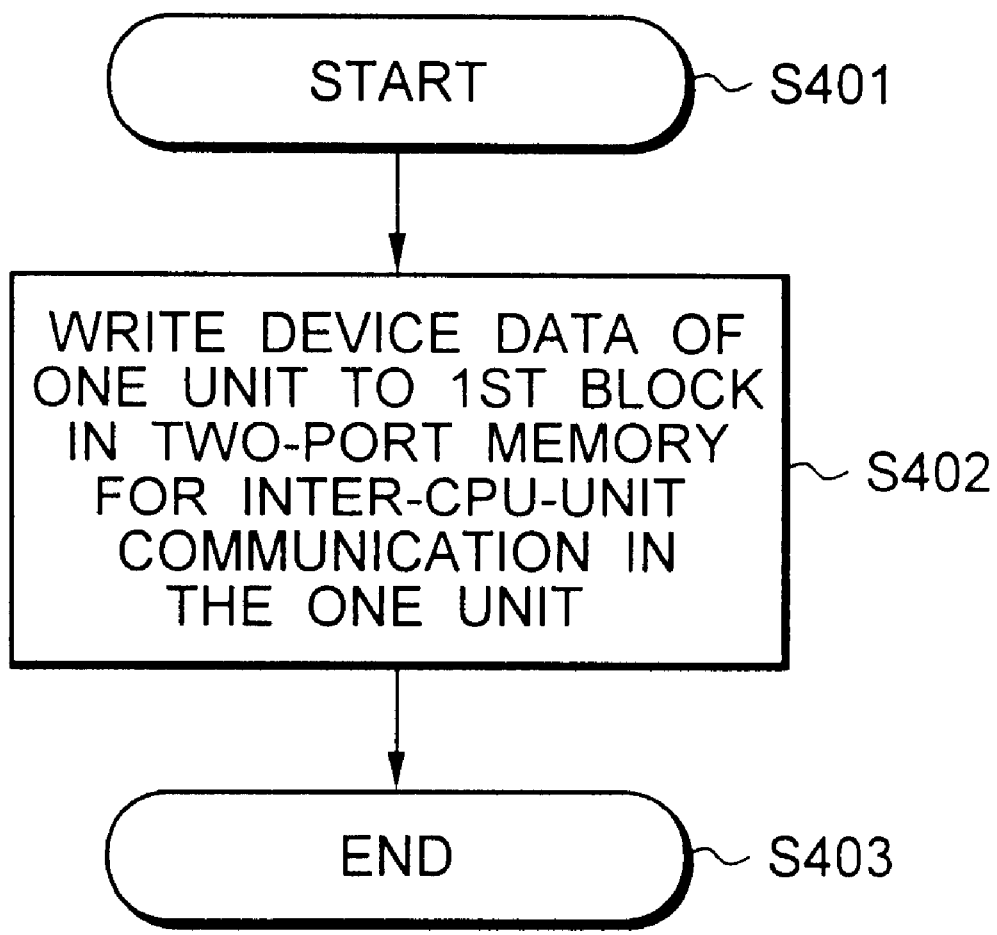
FIG. 4 is a flowchart showing the software concerning the data transfer.

FIG. 3 and FIG. 4 are processing flows of the present embodiment. As shown in FIG. 1, the multi-CPU unit according to the present embodiment comprises the three units of CPU units 1A, 1B, and 1C. As shown in FIG. 2, the CPU units 1A, 1B, and 1C comprise the device memories 3A, 3B, 3C having the device data areas for-CPU units 1A, 1B, and 1C and the two-port memories 4A, 4B, and 4C for inter-CPU-unit communication for communication with the two CPU units other than the one CPU unit of the CPU units 1A, 1B, and 1C, respectively.

The CPU units 1A, 1B, and 1C have the CPU-unit numbers thereof which are determined by numbers written to the OSs 6A, 6B, and 6C which the CPU units 1A, 1B, and 1C have, respectively. The CPU-unit number gives, which number the one CPU unit has under the multi-CPU control operation. Herein, the CPU-unit number of the CPU unit 1A is labeled as 1, the CPU-unit number of the CPU unit 1B as 2, and the CPU-unit number of the CPU unit 1C as 3.

According to the present embodiment, the OS 6A in the CPU unit 1A first writes the contents of the device data area 10A in the CPU unit 1A to a first block in the two-port memory for inter-CPU-unit communication in the CPU unit 1A. The OS 6B also writes the contents of the device data area 11B in the CPU unit 1B to a first block in the two-port memory for inter-CPU-unit in the CPU unit 1B. The OS 6C further writes the contents of the device data area 12C in the CPU unit 1C to a first block in the two-port memory for inter-CPU-unit communication in the CPU unit 1C.

This is indicated by (step S402) in the processing flow of FIG. 4. Accordingly, the device data of the CPU-units themselves is stored to the two-port memories for inter-CPU-unit communication in all of the CPU units.

Moreover, a process of the CPU unit 1A will be described. In order to obtain the device data of the CPU unit 1B, the CPU unit 1A is connected to the two-port memory 4B for inter-CPU-unit in the CPU unit 1B. This is indicated by (step S304) in the flow of FIG. 3. Data in the first block 13B in the two-port memory 4B for inter-CPU-unit communication in the CPU unit 1B is read to the device memory 3A in the CPU unit 1A. In this case, the block into which the data is read by the device memory 3A is calculated from the CPU-unit number. This is indicated by (step S303) in the flow of FIG. 3.

Since the CPU-unit number of the CPU unit 1B which is to be read out is two, the data is read to the second block 11A in the device memory 3A in the CPU unit 1A. Thus, the MPU 2A in the CPU unit 1A writes the data to the device data area 11A for CPU unit B in the device memory 3A in the CPU unit 1A, via the communication lines-5A and 7B. This is indicated by (step S305) in the flow of FIG. 3.

Thereafter, the CPU unit 1A is disconnected to the two-port memory 4B for inter-CPU-unit communication in the CPU unit 1B, thereby completing the communication of the device data of the CPU unit 1B. This is indicated by (step S306) in the flow of FIG. 3.

Next, in order to obtain the device data of the CPU unit 1C, the CPU unit 1A is connected to the two-port memory 4C for inter-CPU-unit communication in the CPU unit 1C. This is indicated by (step S304) in-the flow of FIG. 3. The data of the first block 13C in the two-port memory 4C for inter-CPU-unit communication in the CPU unit 1C is read to the device memory 3A in the CPU unit 1A. In this case, the block into which the data is read by the device memory 3A is calculated from the CPU-unit number. This is indicated by (step S303) in the flow of FIG. 3. The CPU-unit number of the CPU unit 1C to be read is three, so that the data is read to the third block 12A in the device memory 3A in the CPU unit 1A. As mentioned above, the MPU 2A in the CPU unit 1A writes the data to the device data area 12A for CPU unit C in the device memory 3A in the CPU unit 1A, via the communication lines 5A and 7C. This is indicated by (step S305) in the flow of FIG. 3.

Thereafter, the CPU unit 1A is disconnected to the two-port memory 4C for inter-CPU-unit communication in the CPU unit 1C, thereby completing the communication of the device data of the CPU unit 1C. This is indicated by (step S306) in the flow of FIG. 3.

The data communication between the CPU unit 1A and the CPU unit 1B and CPU unit 1C is completed by the aforementioned processes. This is indicated by (step S308) in the flow of FIG. 3.

Similarly, data is communicated between the CPU unit 1B and the CPU unit 1A and CPU unit 1C, and data is communicated between the CPU unit 1C and the CPU unit 1A and CPU unit 1B.

Thereafter, the CPU units 1A, 1B, and 1C transfer the contents of the data storing areas of the CPU units other than one of the CPU units 1A, 1B, and 1C in the two-port memories 4A, 4B, and 4C for inter-CPU-unit communication in the one of the CPU units 1A, 1B, and 1C to the device data areas for the other CPU-units in the device memories 3A, 3B, and 3C of the CPU units 1A, 1B, and 1C, respectively.

According to the thus-constituted multi-CPU unit, only the data storing areas for CPU unit of the CPU units 1A, 1B, and 1C themselves which construct the multi-CPU control operation may be provided for the two-port memories 4A, 4B, and 4C for inter-CPU-unit in the CPU units 1A, 1B, and 1C, respectively. Therefore, the memory capacity can be reduced. In the case of increasing the number of CPU units constructing the multi-CPU control operation, the number of times to write the device data to the two-port memory for inter-CPU-unit communication may be one, so that the processing speed can be decreased.

Second embodiment

Figure 5:
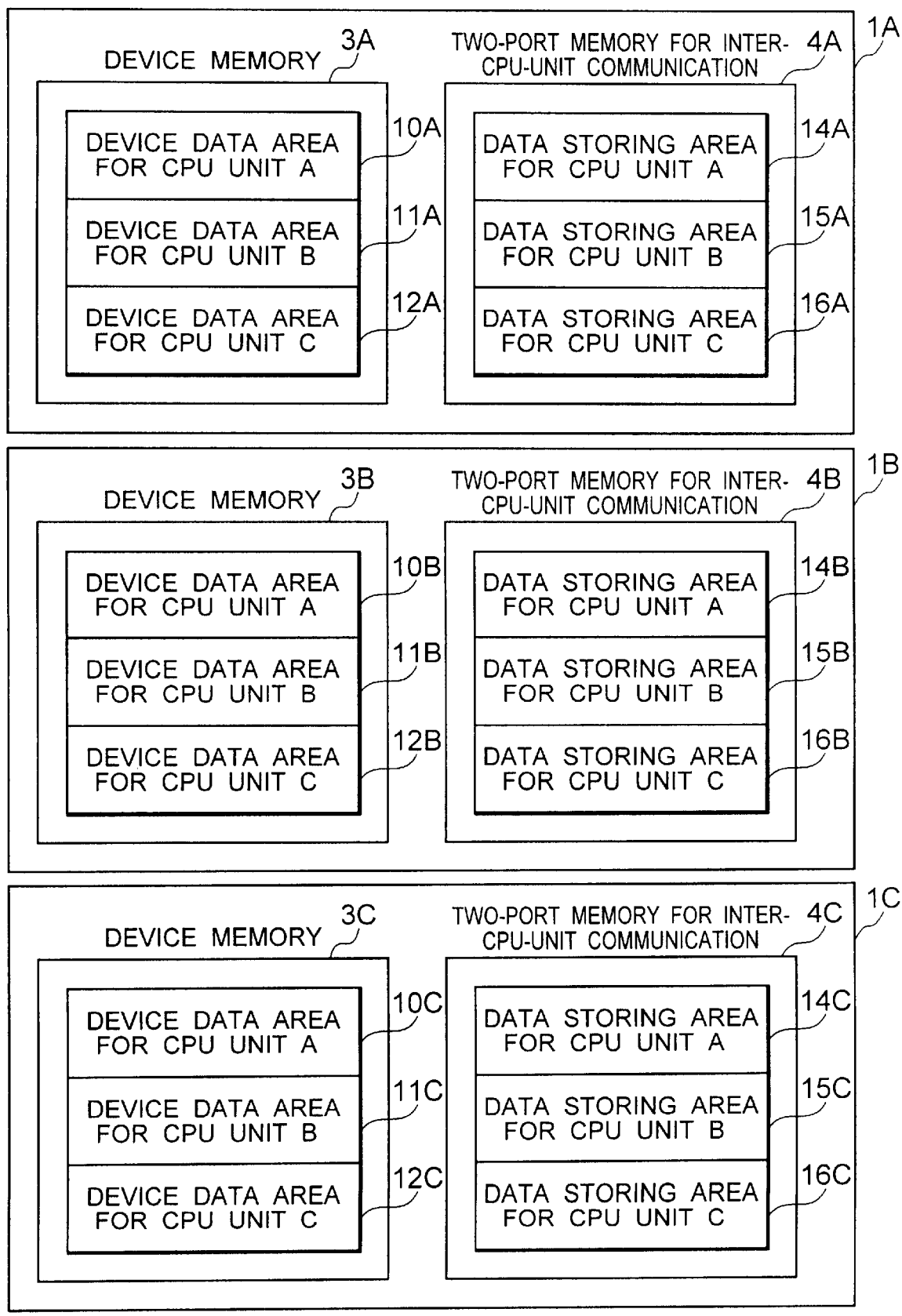
FIG. 5 is a diagram showing the detail of the device memories and two-port memories for inter-CPU-unit communication indicative of another example of the multi-CPU unit according to the present invention.

FIG. 5 is a diagram showing the detail of the device memories and two-port memories for inter-CPU-unit communication which indicates another example of the multi-CPU unit according to the present invention. Referring to FIG. 5, the device memory 3A comprises the device data area 10A for CPU unit 1A, the device data area 11A for CPU unit 1B, and the device data area 12A for CPU unit 1C. The two-port memory 4A for inter-CPU-unit communication comprises a data storing area 14A for CPU unit 1A, a data storing area 15A for CPU unit 1B, and a data storing area 16A for CPU unit 1C.

The device memory 3B also comprises the device data area 10B for CPU unit 1A, the device data area 11B for CPU unit 1B, and the device data area 12B for CPU unit 1C. The two-port memory 4B for inter-CPU-unit communication comprises a data storing area 14B for CPU unit 1A, a data storing area 15B for CPU unit 1B, and a data storing area 16B for CPU unit 1C.

Further, the device memory 3C comprises the device data area 10C for CPU unit 1A, the device data area 11C for CPU unit 1B, and the device data area 12C for CPU unit 1C. The two-port memory 4C for inter-CPU-unit communication comprises a data storing area 14C for CPU unit 1A, a data storing area 15C for CPU unit 1B, and a data storing area 16C for CPU unit 1C. The other construction is similar to that of the first embodiment.

Figure 6:
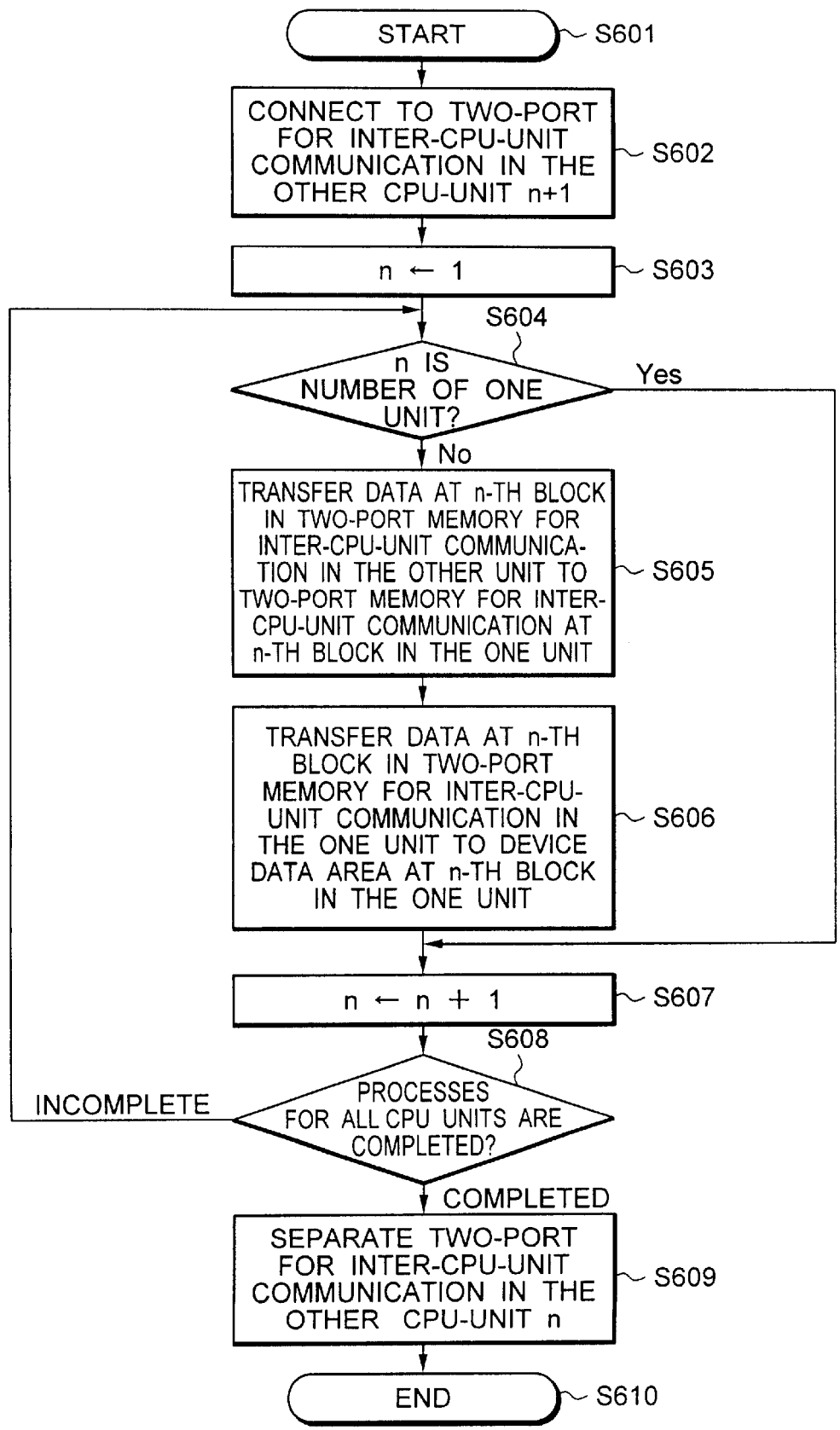
FIG. 6 is a flowchart showing software concerning data transfer.
Figure 7:
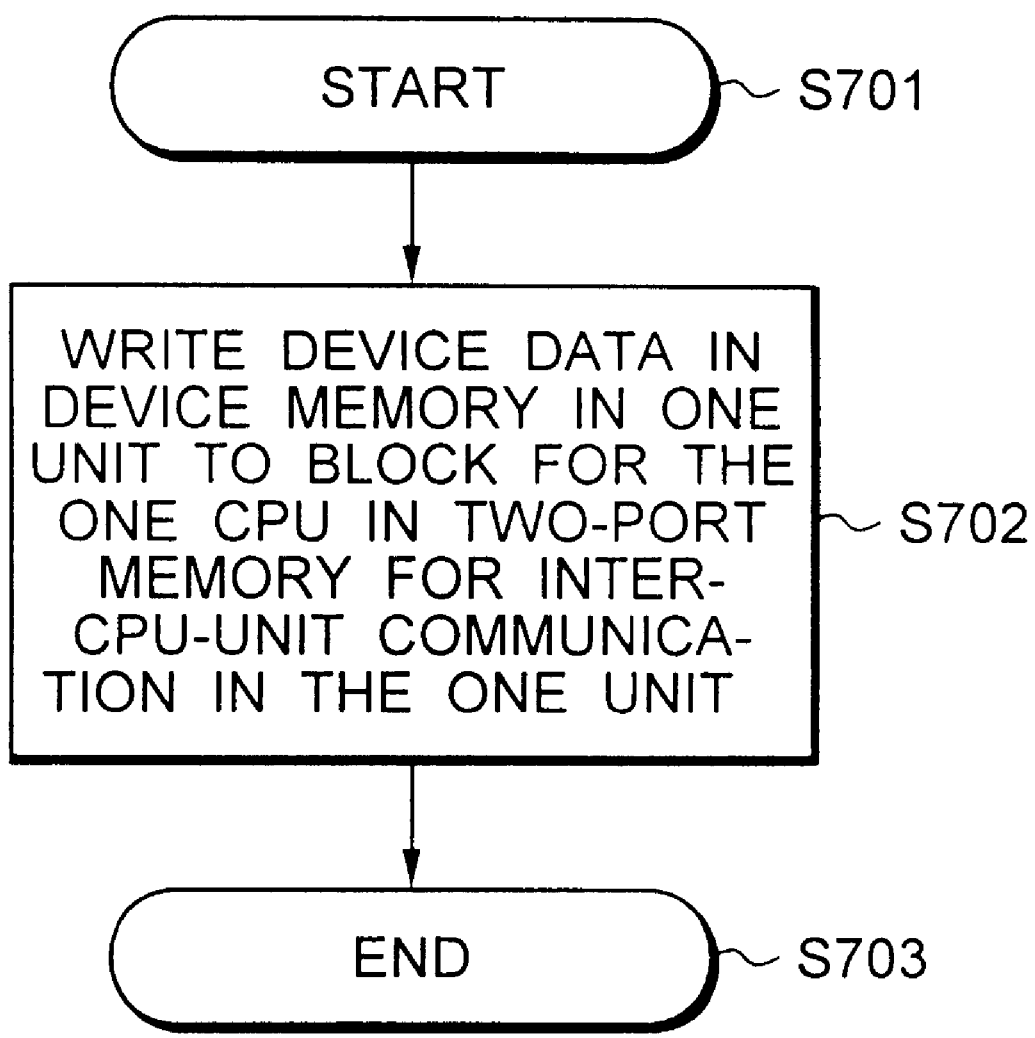
FIG. 7 is a flowchart showing the software concerning the data transfer.

FIG. 6 and FIG. 7 are processing flows of the present embodiment. The OSs 6A, 6B, and 6C, in the CPU units 1A, 1B, and 1C recognize the adjacent CPU-unit numbers from the unit-numbers of the CPU-units 1A, 1B, and 1C, respectively.

According to the present embodiment, first, the contents of the device data area 10A for CPU unit 1A in the device memory 3A in the CPU unit 1A are written to the data storing area 14A for CPU unit 1A in the two-port memory 4A for inter-CPU-unit communication in the CPU unit 1A.

Similarly, the contents of the device data area 11B for CPU unit 1B in the device memory 3B in the CPU unit 1B are written to the data storing area 15B for CPU unit 1B in the two-port memory 4B for inter-CPU-unit communication in the CPU unit 1B.

Likewise, the contents of the device data area 12C for CPU unit 1C in the device memory 3C in the CPU unit 1C are written to the data storing area 16C for CPU unit 1B in the two-port memory 4C for inter-CPU-unit communication in the CPU unit 1C.

If it is assumed that it is recognized that the CPU unit 1C is adjacent to the CPU unit 1B, the OS 6B in the CPU unit 1B connects to the two-port memory 4C for inter-CPU-unit communication in the adjacent CPU-unit 1C and the contents of the data storing area 16C for CPU unit 1C are written to the data storing area 16B for CPU unit 1C in the two-port memory 4B for inter-CPU-unit communication in the CPU unit 1B. Similarly to the conventional example, the area of the two-port memory for inter-CPU-unit communication is calculated from the CPU-unit number.

A description will now be given based on the CPU unit 1A after the above-explained processes. The OS 6A recognizes that the CPU unit 1B is adjacent to the CPU unit 1A. The OS 6A connects to the two-port for inter-CPU communication in the CPU unit 1B which is adjacent thereto. This is indicated by (step S602) in the flow of FIG. 6. A CPU-unit number n is compared with the number of the CPU-unit itself. This is indicated by (step S604) in the flow of FIG. 6. The Os 6A transfers the contents of an n-th block in the two-port memory 4B for inter-CPU communication in the CPU unit 1B, which is connected, to the n-th block in the two-port memory 4A for inter-CPU-unit communication in the CPU unit 1A. This is indicated by (step S605) in the flow of FIG. 6. In this case, the contents of the data storing area 15B for CPU unit 1B in the two-port memory 4B for inter-CPU communication in the CPU unit 1B are transferred to the data storing area 15A for CPU unit 1B in the two-port memory 4A for inter-CPU-unit communication in the CPU unit 1A. The contents of the device data in the data storing area 15A for CPU unit 1B, which are transferred, are transferred to the device data area 11A for CPU unit 1 in the device memory 3A in the CPU unit 1A. This is indicated by (step S606) in the flow of FIG. 6. The area in the device memory is calculated from the CPU-unit number N. In this case, N is 2, so that the area becomes the device data area 11A for the CPU unit B at a second block. The CPU-unit number n is incremented by the corresponding number of CPU units which construct the multi-CPU control operation and similar processes are performed until the processes for all of the CPU units are completed. Those are indicated by (steps S607 and S608). In this case, there is the CPU unit 1C, so that the contents of the data storing area 16A for CPU unit 1C in the two-port memory 4A for inter-CPU-unit communication in the CPU unit 1A are transferred to the device area 12A for CPU unit 1C in the device memory 3A. After the transfer which corresponds to the number of CPU units is completed, the OS 6A in the CPU unit 1A separates the two-port memory for inter-CPU-unit communication in the CPU unit 1B. Thus, the data communicating process for the CPU unit 1A is completed. This is indicated by (step S609) in the flow of FIG. 6.

According to the thus-constituted multi-CPU unit, the data storing areas corresponding to all of the CPU units which construct the multi-CPU control operation are provided for the two-port memories 4A, 4B, and 4C for inter-CPU-unit communication in the CPU units 1A, 1B, and 1C which construct the multi-CPU control operation, respectively, and the CPU unit adjacent to the one CPU-unit is recognized and the recognition data is supplied to the CPU units, thereby reading the device data of all of the CPU units constructing the multi-CPU control operation from the two-port memories for inter-CPU-unit communication of the adjacent CPU unit. Therefore, the connection/disconnection to the two-port memory for inter-CPU-unit communication can be executed once and the time for the data communicating process can be reduced. Similarly to claim 1, even when increasing the number of the CPU units constructing the multi-CPU operation, the number of times to write the data to the two-port memory for inter-CPU-unit communication in the one CPU-unit to the device memory therein may be one and the time for the data communicating process can be further reduced.

Third embodiment

Figure 8:
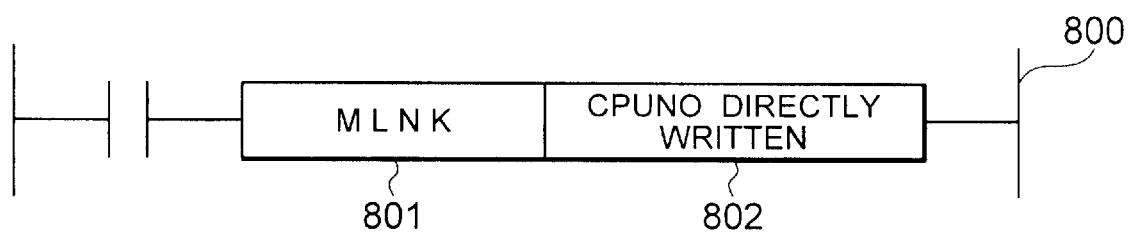
FIG. 8 is a diagram showing a unit-number designating transfer instruction indicative of another example of the multi-CPU unit according to the present invention.

FIG. 8 shows a unit-number designating transfer instruction which indicates another example of the multi-CPU unit according to the present invention. Referring to FIG. 8, reference numeral 801 denotes an instruction name and 802 denotes a portion at which the CPU-unit number that is directly written is designated. The device data of the device memory in one CPU-unit is directly written to the two-port memory for inter-CPU-unit communication in the designated CPU-unit in response to the unit-number designating transfer instruction 801.

Figure 9:
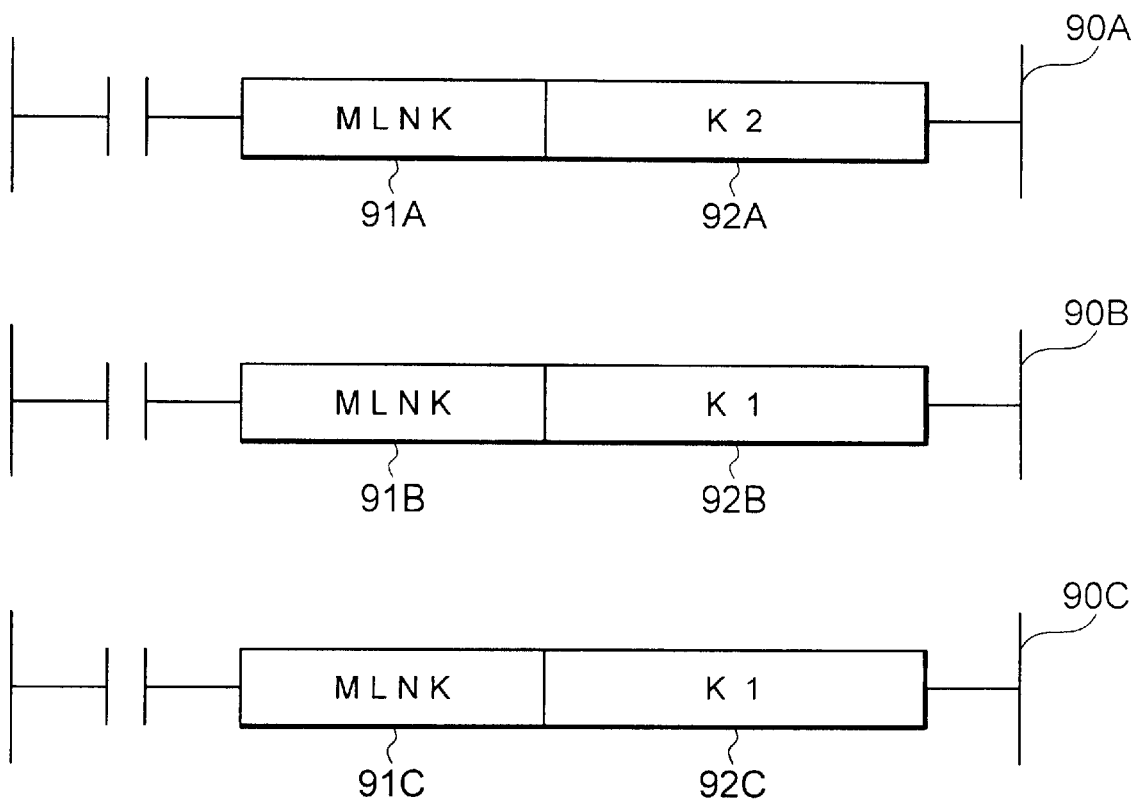
FIG. 9 is a diagram showing an actual example of the unit-number designating transfer instruction.

FIG. 9 shows an actual example of the above-discussed unit-number designating transfer instruction. Reference numeral 90A corresponds to the CPU unit 1A, 90B to the CPU unit 1B, and 90C to the CPU unit 1C. Reference numerals 91A, 91B, and 91C correspond to instruction names, respectively.

That is, 92A denotes writing of the device data to the two-port memory for inter-CPU-unit of the CPU-unit number 2, 92B denotes writing of the device data to the two-port memory for inter-CPU-unit of the CPU unit number 1, and 92C denotes writing of the device data to the two-port memory for inter-CPU-unit of the CPU unit number 1.

Figure 10:
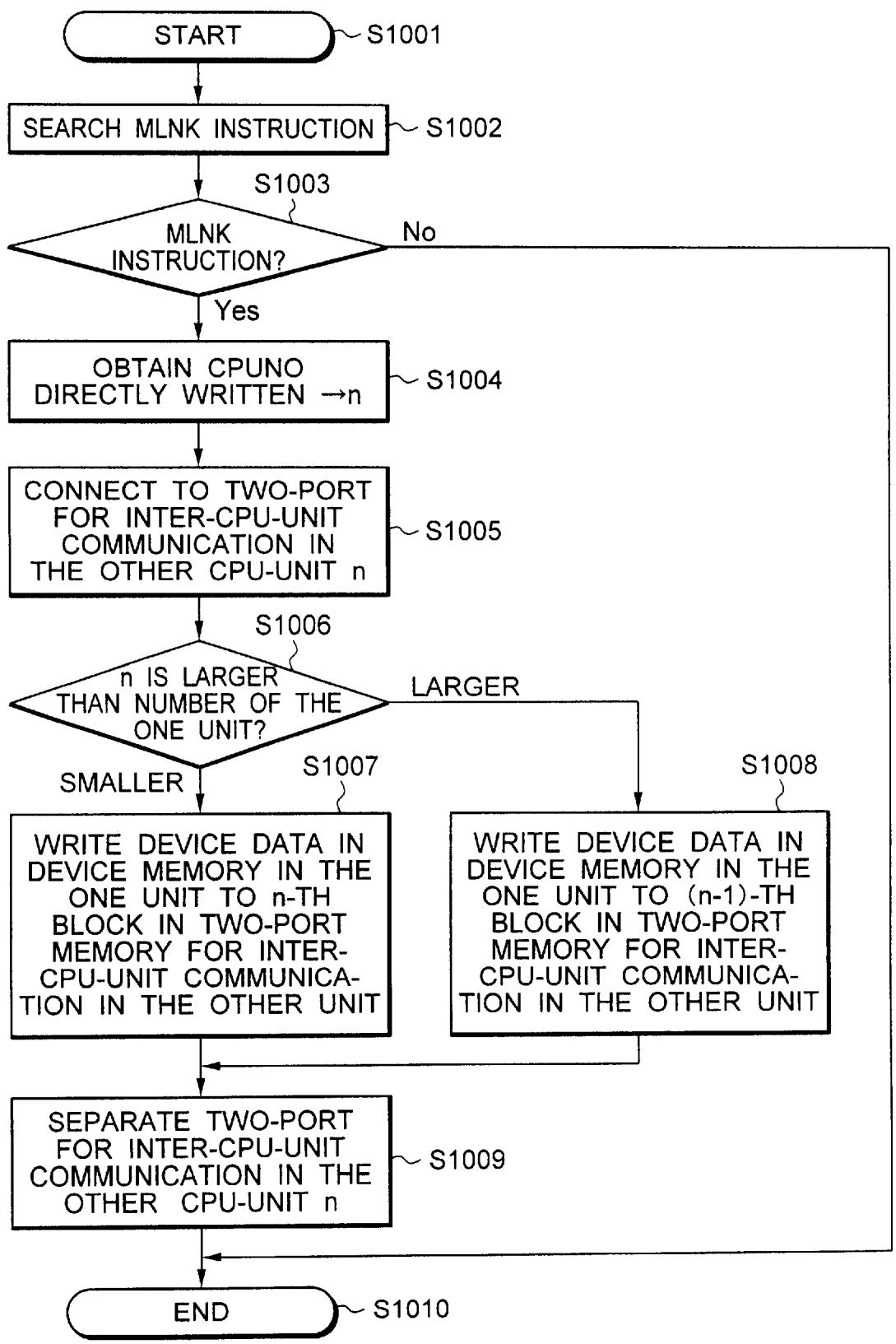
FIG. 10 is a flowchart when the unit-number designating transfer instruction is executed.
Figure 11:
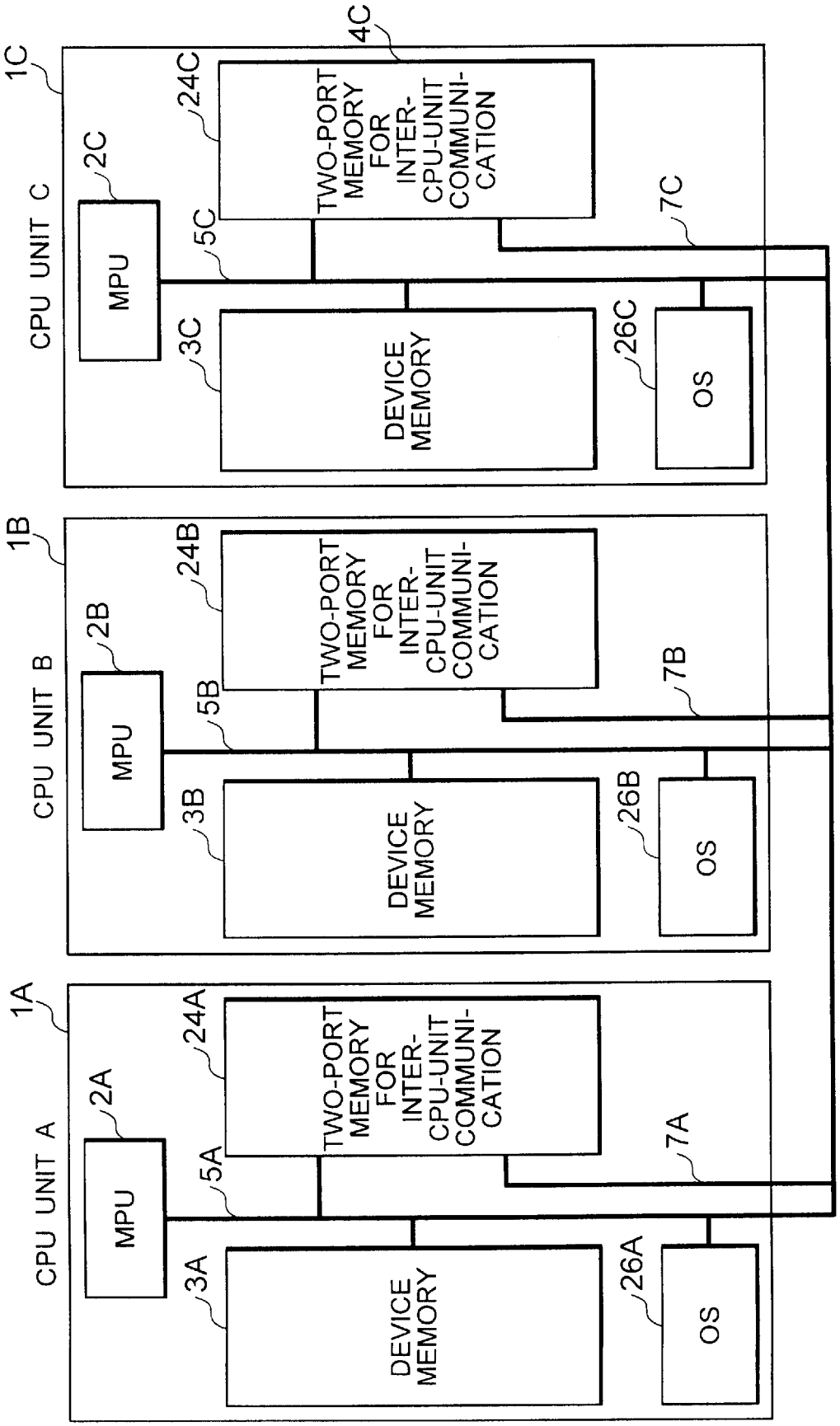
FIG. 11 is a structural diagram of a conventional multi-CPU unit.
Figure 12:
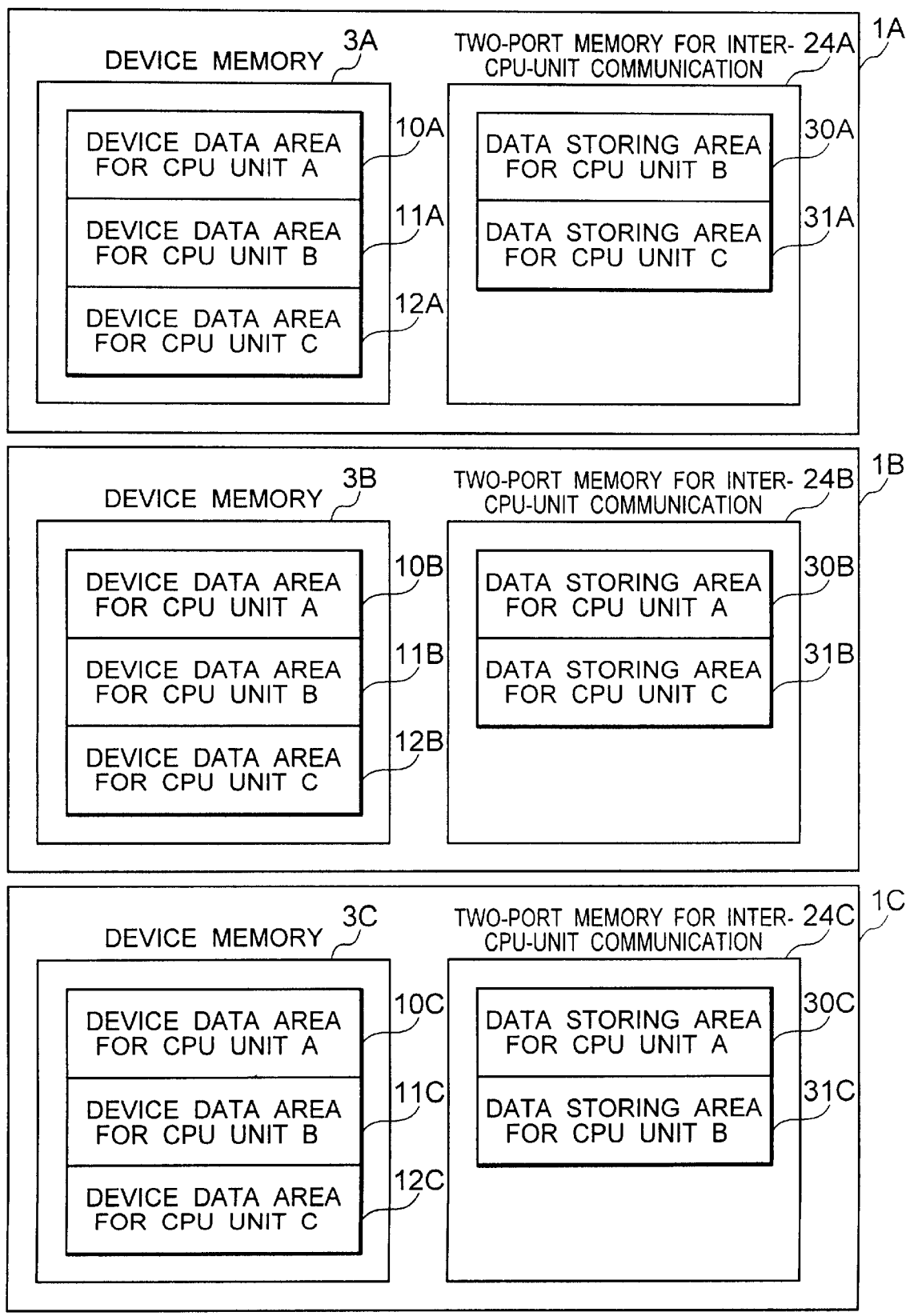
FIG. 12 is a diagram showing the detail of device memories and two-port memories for inter-CPU-unit communication.
Figure 13:
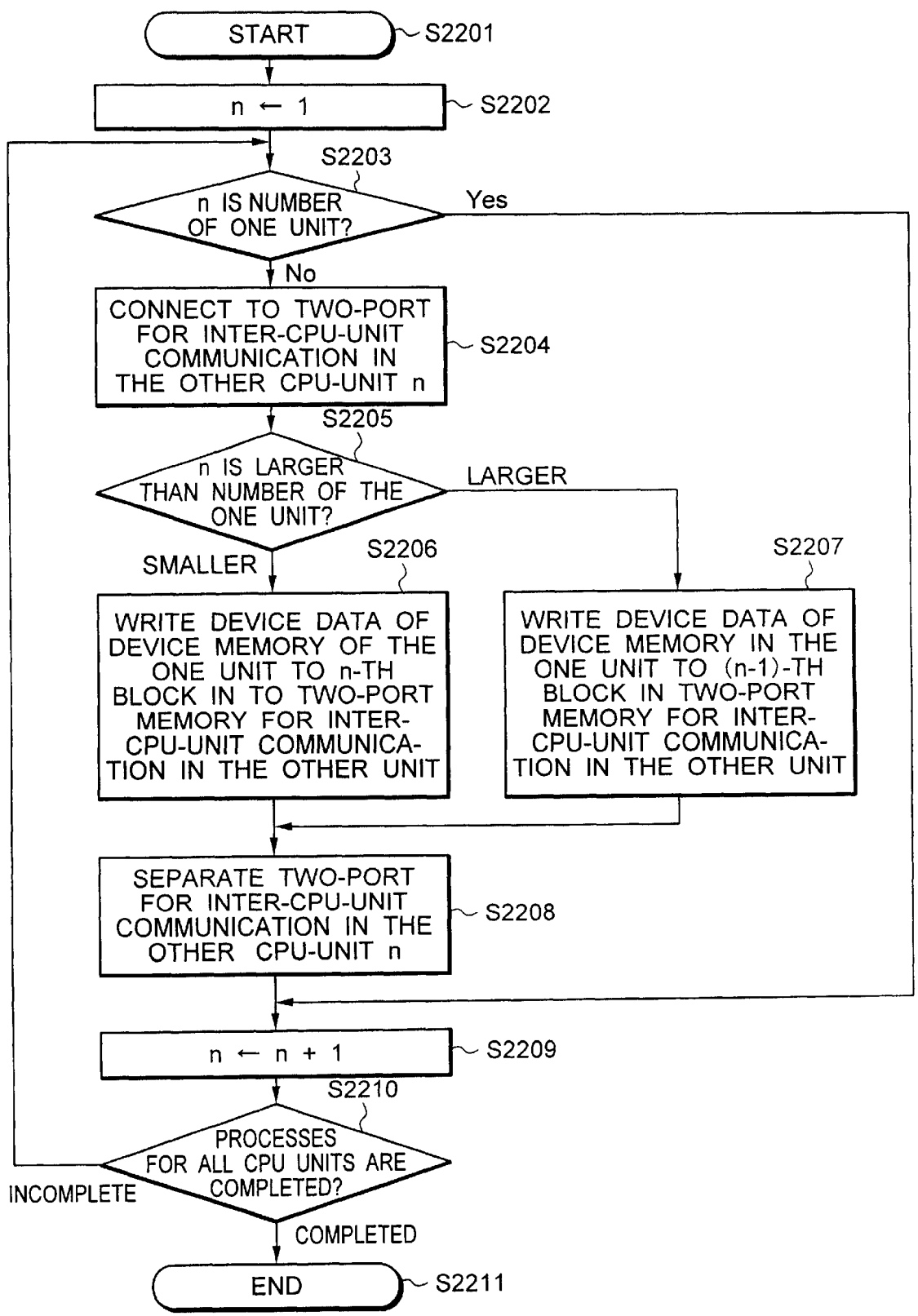
FIG. 13 is a flowchart showing software concerning data transfer between the device memory and two ports for communication.

FIG. 10 is a flowchart when the above-explained instruction is executed. The data is communicated under the multi-CPU control operation by using the unit-number designating transfer instruction. The description will now be based on that the CPU unit 1A is set to the reference.

The CPU unit to which the data can be written directly by the CPU unit 1A is designated to the CPU unit 1B (92A in FIG. 9), the CPU unit to which the data can be written directly by the CPU unit 1B is designated to the CPU unit 1A (92B in FIG. 9), and the CPU unit to which the data can be written directly by the CPU unit 1C is designated to the CPU unit 1A (92C in FIG. 9). Those are: indicated by (steps S1001 to S1004) in the processing flow of FIG. 10. As a result of the setting, the data of the device memory for the CPU unit 1A is stored into the data storing area 14B for CPU unit 1A in the two-port memory 4B for inter-CPU-unit communication in the CPU unit 1B.

The device data for the unit 1B and the CPU unit 1C is stored into the data storing area 15A for CPU unit 1B and the data storing area 16A for CPU unit 1C in the two-port memory 4A for inter-CPU-unit communication in the CPU unit 1A, respectively. Those are indicated by (steps S1005 to S1009) in the processing flow of FIG. 10.

Similarly to the conventional example, the storing block to the two-port memory 4A for; inter-CPU-unit communication is calculated from the CPU-unit number. The CPU-unit 1A transfers the contents of the data storing area 15A for CPU unit 1B and the contents of the data storing area 16A for CPU unit 1C in the two-port memory 4A for inter-CPU-unit communication in the. CPU unit 1A to the device data area 11A for CPU unit Brand the device data area 12A for CPU unit 1C in the device memory 3A, thereby communicating the data under the multi-CPU control operation.

According to the multi-CPU unit having such a constitution, the instruction designates, to the two-port memory for inter-CPU unit communication, to which CPU-unit, other than the one CPU-unit which constructs the multi-CPU control operation, data is written.: The data is written to the two-port memory for inter-CPU-unit communication in the designated CPU-unit. Therefore, in, the flowchart of the transfer shown in FIG. 10, although n is incremented, no looped-portion exists and the program is made simple. It is also possible to easily designate the CPU unit to which the data is not transferred.

Industrial Applicability

According to the present invention, there is provided one multi-CPU unit having a plurality of CPU units which are used for multi-CPU control operation, in which each of the CPU units comprises a device memory for handling device data, a shared memory in which data can be read and written from/to each of the CPU units itself and the other CPU-unit, an OS to which the sequence of data transfer is written, and a microprocessor for transferring data between each of the CPU units itself and the other CPU-unit on the basis of the sequence which is written to the OS, each microprocessor reading the device data which is stored in the shared memory in the other CPU-unit to the device memory in each of the CPU units itself. Therefore, it is sufficient to provide only a storing area of each of the CPU units itself in the shared memory, so that the memory capacity can be reduced. If the number of CPU units which construct the multi-CPU control operation is increased, the number of times to write the device data to the shared memory may be one and, thus, the processing speed can be decreased.

The device memory has a device data area for each of the CPU units itself and a device data area for the other CPU-unit which corresponds to the number of the other CPU-units, and each microprocessor reads the device data which is stored in the shared memory in the other CPU-unit to the device data area for the other CPU-unit in each of the CPU units itself. Therefore, only the storing area for each of the CPU units itself may be provided in the shared memory, so that the memory capacity can be decreased. If the number of CPU units which construct the multi-CPU control operation is increased, the number of times to write the device data to the shared memory may be one and, thus, the processing speed can be decreased.

According to the present invention, there is provided another multi-CPU unit having a plurality of CPU units which are used for multi-CPU control operation, in which each of the CPU units comprises a device memory for handling device data, a shared memory in which data-can be written and read to/from each of the CPU units itself and the other CPU-unit, an OS to which the sequence of data transfer is written, and a microprocessor for transferring data between each of the CPU units itself and the other CPU-unit on the basis of the sequence which is written to the OS, the shared memory having a device data area for each of the CPU units itself and a device data area for the other CPU-unit which corresponds to the number of the other CPU-units and each microprocessor reading the device data of all of the other CPU units which is stored in the shared memory of the adjacent CPU-unit to the device data area for the other CPU-unit in the shared memory of each of the CPU units itself. Therefore, the connection/disconnection to the two-port memory for inter-CPU-unit communication can be performed once and the time for the data communicating process can be reduced.

According to the present invention, there is provided yet another multi-CPU unit having a plurality of CPU units which are used for multi-CPU control operation, in which each of the CPU units comprises a device memory for handling device data, a shared memory in which data can be written and read to/from each of the CPU units itself and the other CPU-unit, an OS to which sequence of data transfer is written, and a microprocessor for transferring data between each of the CPU units itself and the other CPU-unit on the basis of the sequence which is written to the OS, the OS designating a unit number of the other CPU-unit and having a unit-number designating transfer instruction for directly transferring data to the shared memory in the other CPU-unit, and the microprocessor data-transfering the device data of the device memory of each in the CPU units itself to the shared memory in the other CPU-unit by using the unit-number designating transfer instruction. Therefore, it is possible to make the program simple and also to easily designate the CPU unit to which no data is transferred.

The shared memory has a device data area for each of the CPU units itself and a device data area for the other CPU-unit which corresponds to the number of the other CPU-units, and the microprocessor data-transfers the device data for the device memory in each of the CPU units itself to the device data area for the other CPU-unit in the shared memory in the other CPU-unit by using the unit-number designating transfer instruction. Therefore, it is possible to make the program simple and also to easily designate the CPU unit to which no data is transferred.

What is claimed:

1. A multi-CPU unit having a plurality of CPU units which are used for multi-CPU control operation, wherein each of said CPU units comprises:

a device memory for handling device data;

a shared memory comprising a two-port memory which has only a data storing area for each of said CPU units itself in which data can be written and read to/from each of said CPU units itself and the other CPU-unit;

an OS to which the sequence of data transfer is written; and a microprocessor for transferring data between each of said CPU units itself and the other CPU-unit on the basis of the sequence which is written to said OS, wherein each of said microprocessors writes said device data which is stored in said device memory to said data storing area in each of said CPU units itself in the shared memory of each of said CPU units itself and directly reads the device data which is stored in said shared memory in the other CPU-unit to said device memory in each of said CPU units itself.

2. A multi-CPU unit according to claim 1, wherein said device memory has a device data area for each of said CPU units itself and a device data area for the other CPU-unit which corresponds to a number of the other CPU-units, and each of said microprocessors directly reads the device data which is stored in said shared memory in the other CPU-unit to said device data area for the other CPU-unit in the device memory in each of said CPU units itself.

* * * * *